United States Patent

[11] 3,633,360

[72] Inventor Archie P. Kelley
Scottsdale, Ariz.

[21] Appl. No. 4,357
[22] Filed Jan. 20, 1970
[45] Patented Jan. 11, 1972
[73] Assignee Talley Industries, Inc.
Mesa, Ariz.

[54] BOOST STARTER SYSTEM
10 Claims, 8 Drawing Figs.

[52] U.S. Cl. .......... 60/39.14, 123/179 F
[51] Int. Cl. .......... F02c 7/26
[50] Field of Search .......... 60/39.14; 123/179 F, 179 S

[56] References Cited

UNITED STATES PATENTS

| | | | |
|---|---|---|---|
| 2,752,023 | 6/1956 | Cain et al. .......... | 60/39.14 |
| 2,942,415 | 6/1960 | Bayard .......... | 60/39.14 |
| 3,151,452 | 10/1964 | Bunger et al. .......... | 60/39.14 |
| 3,485,041 | 12/1969 | Evans .......... | 60/39.14 |

*Primary Examiner*—Mark M. Newman
*Assistant Examiner*—Warren Olsen
*Attorney*—Pennie, Edmonds, Morton, Taylor and Adams

ABSTRACT: A torque augmentation means for starters to be employed during low-temperature starts or for other conditions when starting would be marginal or impractical with the normal starting system. The boost starter consists of a propellant actuated gas rotary motor coupled to the normal starting motor shaft by means of a clutch. A replaceable propellant cartridge provides the gas source for operation of the boost motor.

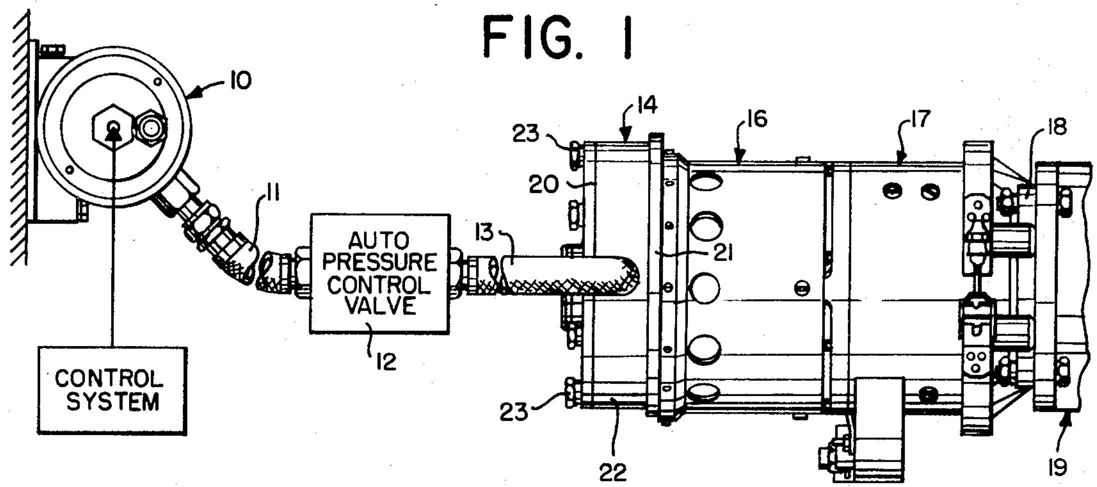
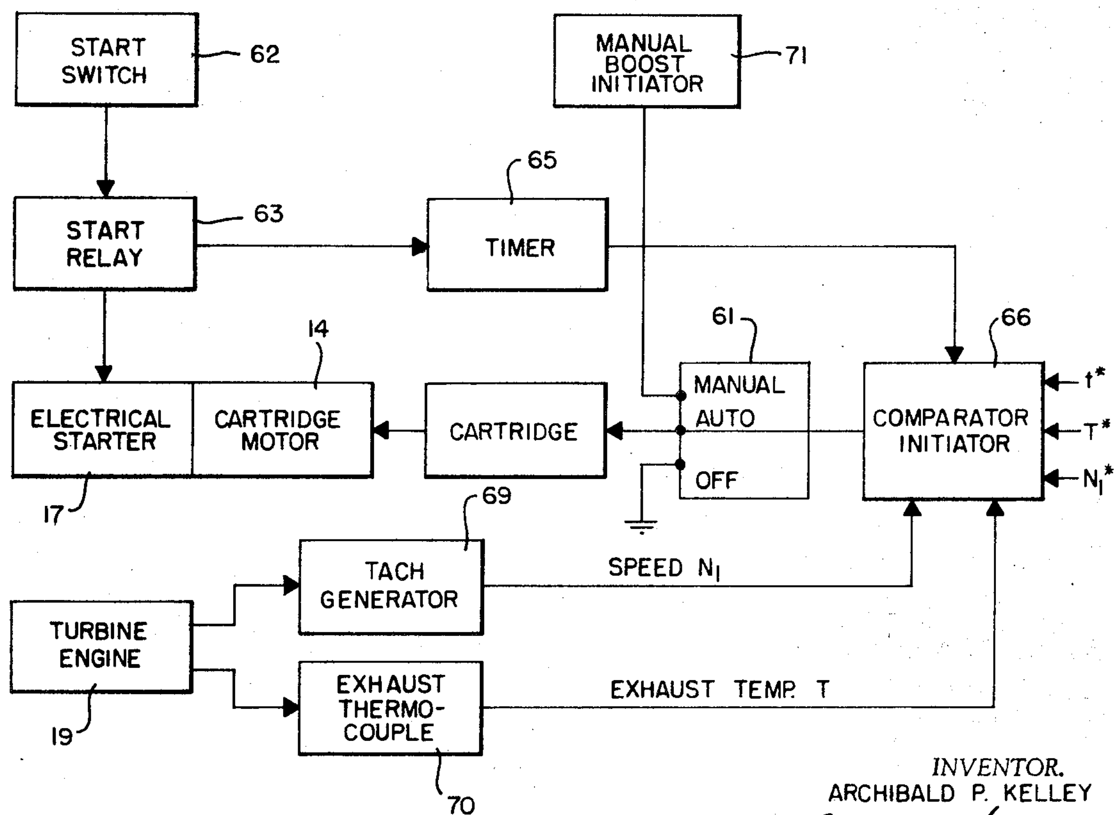
INVENTOR.
ARCHIBALD P. KELLEY
BY Fennie, Edmonds, Morton, Taylor & Adams
ATTORNEYS

INVENTOR.
ARCHIBALD P. KELLEY

BY Pennie, Edmonds, Morton, Taylor & Adams

ATTORNEYS

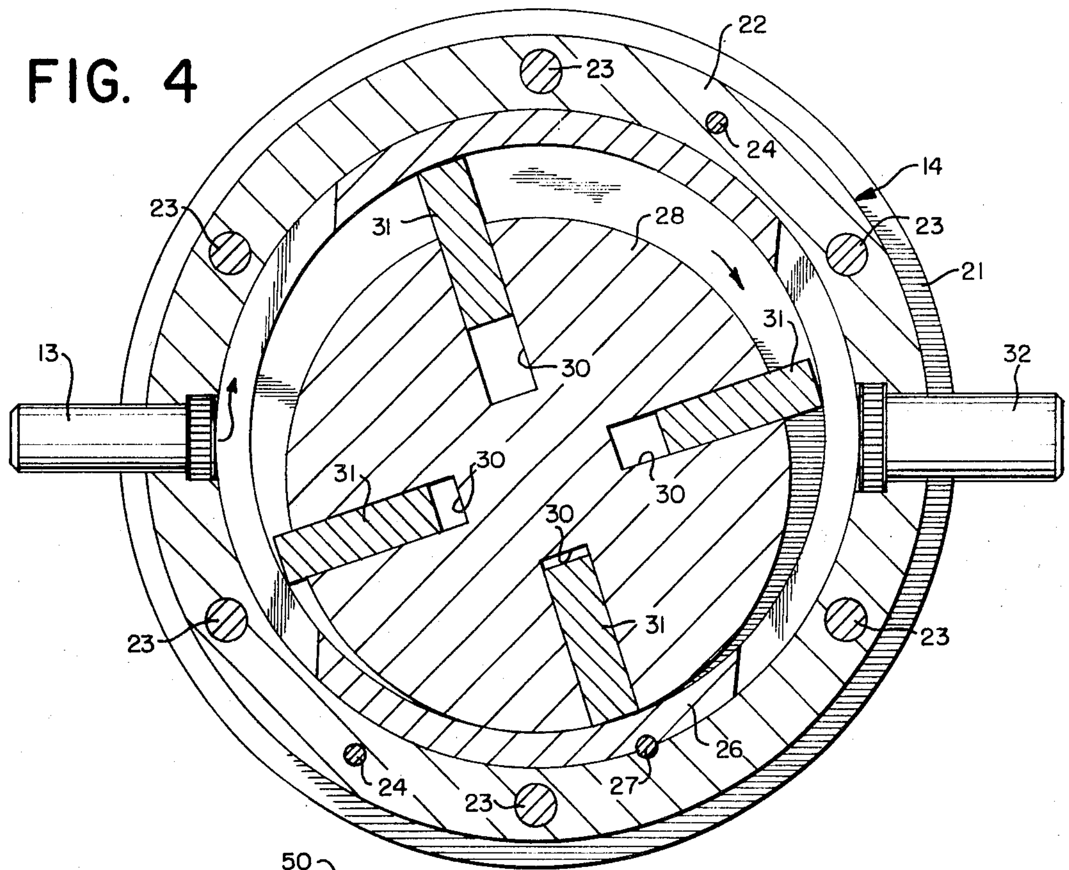
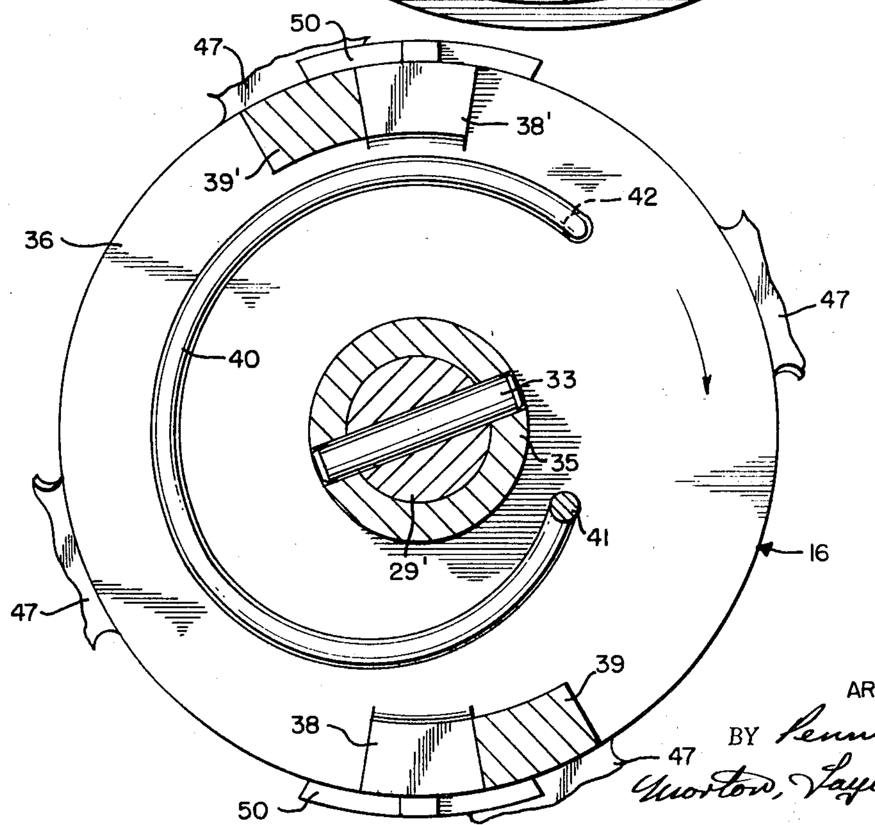
INVENTOR.
ARCHIBALD P. KELLEY
BY Pennie, Edmonds, Morton, Taylor & Adams
ATTORNEYS

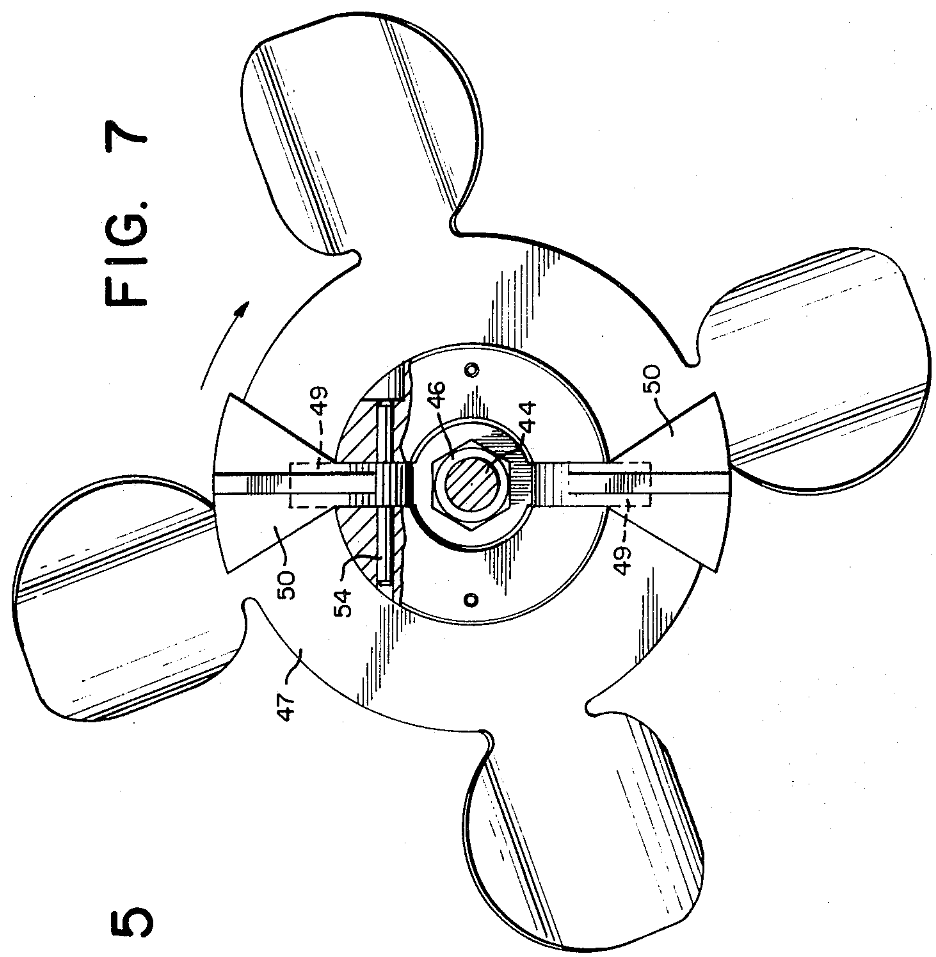
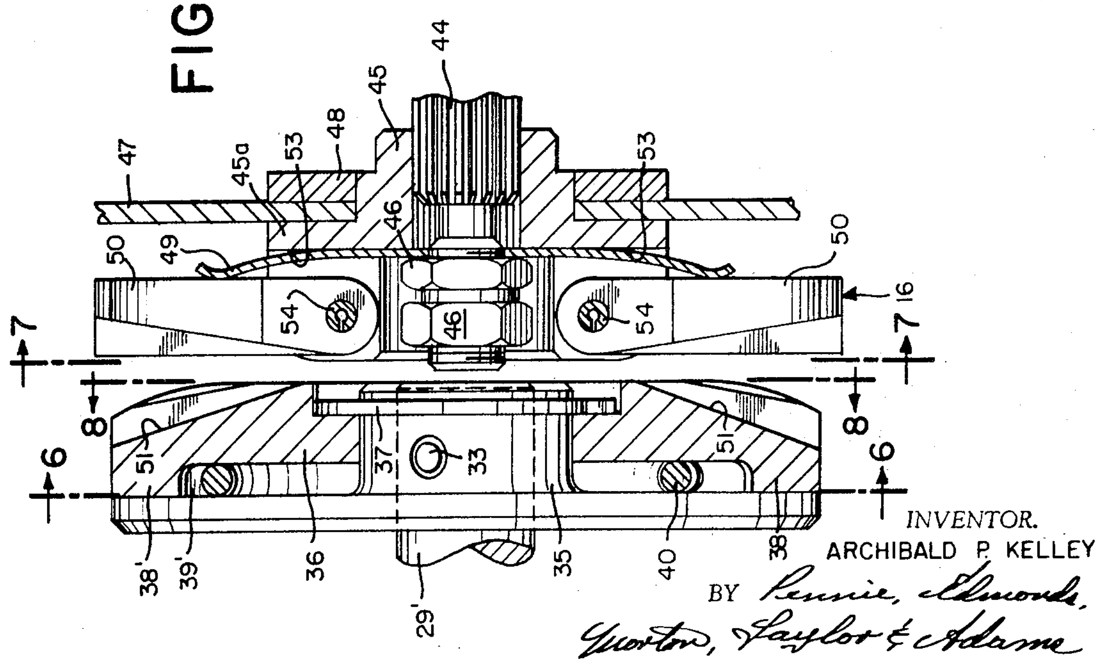
INVENTOR.
ARCHIBALD P. KELLEY
BY Pennie, Edmonds,
Morton, Taylor & Adams
ATTORNEYS

BOOST STARTER SYSTEM

BACKGROUND OF THE INVENTION

Turbine aircraft engines, in the smaller horsepower classes (200–1500 SHP) normally employ electric starting systems in which a storage battery of the lead-acid or nickel-cadium-type is used to energize a starter motor which rotates the turbine engine to its self sustaining speed by means of accessory gears coupled to the turbine shaft. Unlike the automotive piston engine the gas turbine must be rotated to a relatively high fraction of its normal operating speed for self-sustained idle performance. A relatively large amount of electrical energy is required to rotate the turbine to the self sustaining speed. Since storage batteries are inherently heavy energy sources, little margin is normally allowed in aircraft design for battery charge depletion or extremely cold ambient conditions. The consequences of attempting a turbine start with a deficient battery charge can be serious since damaging turbine temperatures can be encountered if the turbine speed is too low during initial combustion of the fuel. It is well known among aircraft turbine manufacturers and users that this so-called "hot start" situation is a major cause of premature turbine failure.

Several methods have been suggested and employed for improving the starting performance of gas turbine engines. These include extra-heavy duty battery supplies, ground-based starting generators, on board auxiliary power units and the replacement of the electric starting systems with high-capacity pneumatic, cartridge, or hydraulic starting systems.

The employment of ground-based boost starting systems is not applicable to those aircraft and helicopters which may frequently be employed at remote and unequipped areas. Boost or replacement systems based upon additional batteries, pneumatic and hydraulic storage cylinders, etc., have the disadvantage of high weight penalty for a system used only in emergency or unusual conditions. In addition, with the exception of extra batteries, the substitute systems previously required additional means for coupling the substitute starter motor to the engine. Most turbine engines have only one starter pad provided on the accessory gear case, such that the addition of a second type of starter would require major changes to the engine.

The present invention represents the lightest possible boost starter approach in that the solid propellant energy source coupled with the gas motor is one of the lightest known energy systems for occasional short term energy requirements.

SUMMARY OF THE INVENTION

In accordance with the invention, a starter, for example of the electric starter or starter generator type is equipped with a rotary gas-operated boost starter motor which is connected directly and coaxially to the starter power shaft through air intermediate clutching device. The rotary motor need not deliver by itself full starting power since its primary function is to deliver additional power to the electric starter which may under certain special circumstances, be unable to deliver full starting power. The combined boost starter and starter are extremely compact and mounted as a single unit in the manner of conventional starter systems.

In accordance with a further aspect of the invention, automatic controls are provided for initiating the boost motor when the electric starter has insufficient power to accomplish a satisfactory start.

In order to understand the invention, attention is invited to the following description and the accompanying drawing.

BRIEF DESCRIPTION OF THE DRAWING

FIG. 1 is an overall view of a boost starter system according to the present invention;

FIG. 2 is a block diagram of the system in combination with automatic control therefor;

FIG. 4 is a view taken in the direction of arrows 4—4 of FIG. 3;

FIG. 5 is a vertical cross section of the clutch assembly and its connection with the starter;

FIG. 6 is a view taken in the direction of arrows 6—6 of FIG. 5;

FIG. 7 is a view taken in the direction of arrows 7—7 of FIG. 5; and

DESCRIPTION OF A PREFERRED EMBODIMENT

Figure 3:
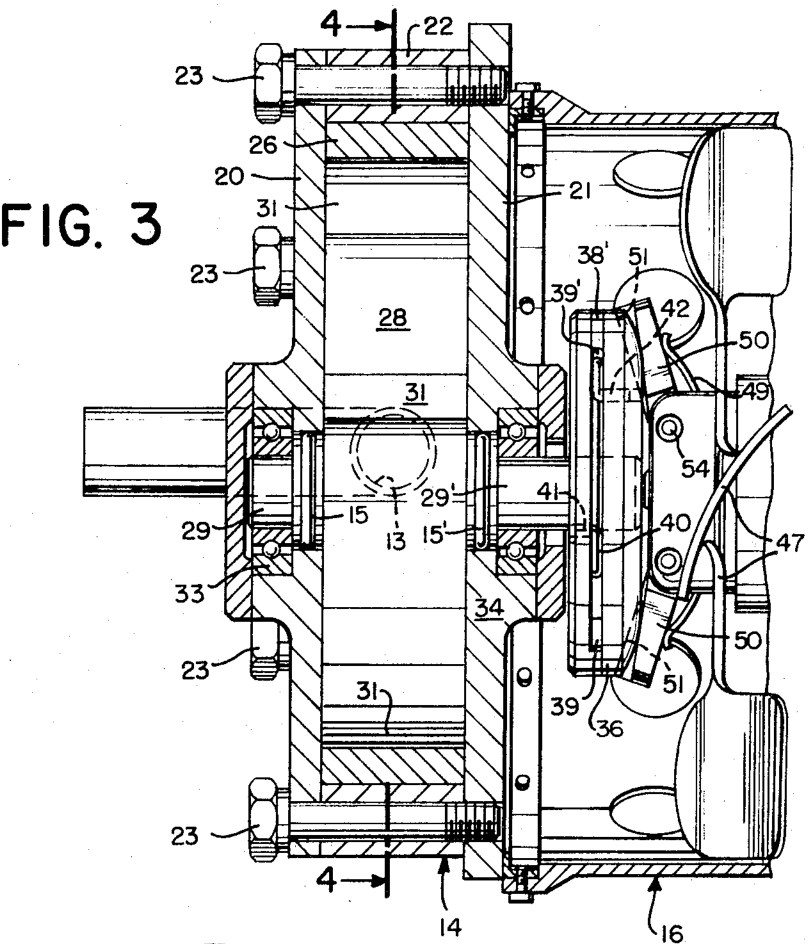
FIG. 3 is a vertical cross section of the boost motor and clutch assembly.
Figure 8:
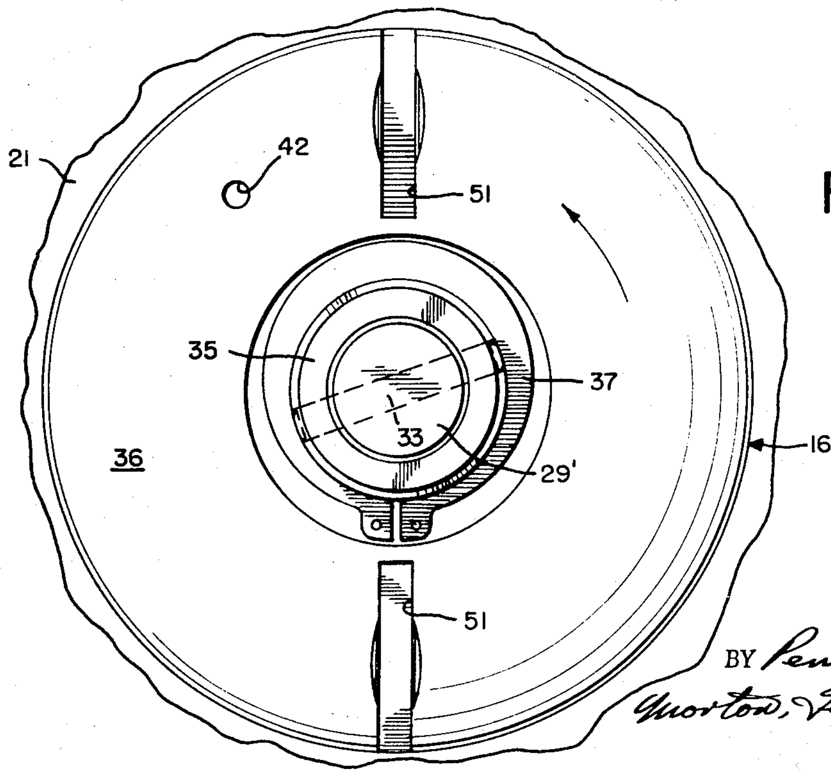
FIG. 8 is a view taken in the direction of arrows 8—8 of FIG. 5.

Referring now to the drawing and initially to FIG. 1 therefore, the boost starter system according to the present invention includes a gas generator 10 of conventional design which includes a breech and means for firing a chemical cartridge for the generation of high-pressure gas. As indicated, a control system for initiating fire of the cartridge is provided which will later be described in detail in connection with FIG. 2. High-pressure tubing 11 conducts gas from the generator 10 through a pressure control valve 12 which regulates the gas pressure at a suitable level. Gas under pressure further continues through conduit 13 to the inlet **13*a* of a gas motor 14**.

The operation of gas motor 14 in conjunction with a clutch whose housing is indicated externally as reference numeral 16 will be described presently. It will suffice in describing the overall arrangement of the boost starter system of FIG. 1 to state that a starter generator 17 is mounted upon the starter pad 18 of a turbine engine 19 of the type for example which would power a helicopter. The cooperation of the motor, clutch and starter generator will now be described in detail.

Referring first to FIGS. 3 and 4, the gas motor 14 receives high-pressure gas through the conduit 13 connected to the circular outer end plate 20 of the motor. The motor 14 has an opposing inner end plate 21. Intermediate end plates 20 and 21 is a body 22 in the form of a ring which is secured between plates 20 and 21 by means of peripheral bolts 23 and and dowel pins 24. A bearing liner 26 is tightly positioned within the interior of body 22 and is located with respect thereto by means of a pin 27. The liner 26 has an input slot 27 which is adapted to communicate with inlet 13.

A rotor 28 is mounted eccentrically within the bore of liner 26 upon a shaft, opposite ends of which have been designated 29 and 29'. Gas seals 15, 15' seal the shaft ends 29, 29'. Each of the shaft ends 29, 29' is journaled in bearings 25, 25'. The rotor 28 has four equally spaced slots 30 therein. Each of the slots 30 receives vanes 31 the outer ends of which during rotation of the rotor are held in contact with the bore of the liner 26 due to centrifugal force. Accordingly, high-pressure gas admitted through inlet 13 to slot 27 will act upon the exposed areas of each vane 31 to drive the rotor 28 in the direction indicated. The gas is exhausted through exhaust slot 31 in the liner 26 and exhaust exit 32.

Coaxially mounted upon the end of rotor shaft 29' is a backing plate 34. The plate 34 has a hub 35 which is coaxial with respect to shaft end 29'. The hub 35 is secured to shaft end 29' by a pin 33. The clutch plate 36 is rotatably mounted over hub 35 and retained therein by means of a retaining ring 37. The backing plate 34 and clutch 36 each have integral lugs 38, 38' and 39 and 39', respectively on the plate and clutch member which when brought into position shown in FIG. 6 will cause the members to be driven together. Prior to the engagement, the plate and clutch 34, 36 will be held out of rotational engagement by means of spring 40 the ends 41 and 42 of which are respectively secured in holes within the backing plate 34 and clutch member 36. Accordingly, upon rotation of the backing plate 34 by the motor 14, the plate 34 will rotate against spring pressure for some angular travel until the lugs 38, 38' on the backing plate 34 and lugs 39, 39' on the clutch member 36 engage.

As best seen in FIG. 5, the outer end of the starter generator shaft 44 has affixed thereto a collar 45 by means of lock bolt combination 46. The starter generator fan 47 is held against a flange 45*a* of the collar 45 by a retainer 48. A leaf spring 49 is secured to the shaft 44 by the bolt 46. Spring 49 biases centrifugal lugs 50 into engagement within slots 51 within the clutch member 36 so that normally the clutch member 36 when rotated will drive the shaft 44 through the agency of lugs 50. Lugs 50 are pivotally mounted within slots 53 by means of pivot pins 54 in the collar 45.

The operation of the boost starter system with respect to the foregoing components is as follows: Assuming a condition wherein it becomes necessary to assist the starter generator 17 to start the turbine engine 19, a cartridge will be fired in the gas generator 10 either manually or in accordance with the automatic control system of FIG. 2 as will be described. Gas under high pressure will flow through tubing 11, to auto-pressure control valve 12 and therefrom through conduit 13 to the inlet 13*a* of the gas motor 14. The introduction of high-pressure gas into the motor 14 will effect rotation of rotor 28 by means of the gas impinging successively upon vanes 31 due to the eccentric relationship between the axis of the rotor 28 and the interior bore of liner 26. The rotor is affixed to a backing plate 34 which is adapted to drive clutch member 36 upon engagement of lugs 38, 38' and 39, 39' mounted upon the respective components. Interengagement of the lugs is initially resisted by a spring 40 which has the function of minimizing the shock of interengagement which would otherwise occur. The starter generator 17 has securely mounted upon its shaft 44 two centrifugal lugs 50 which are normally held within slots 51 in the clutch member 36, the lugs 50 being urged into this position by a spring disc 47. When the gas motor 14 fires and rotates the clutch member 36, the motor 14 will effect rotation of the starter generator shaft 44 to assist the starter generator in starting the turbine engine 19. When the turbine engine is accelerated to a predetermined revolutionary speed beyond a starting level, the lugs 50 will be withdrawn by centrifugal action from the slots 51 in clutch member 36, thereby disengaging the clutch member.

Alternatively, the slots 51 may be bevelled or ramped on the side opposite the direction of rotation to effect disengagement between the starter generator 17 and the gas motor 14 until the latter has been fired.

The automatic control feature of the invention as illustrated in FIG. 2 will now be described. With the boost starter control switch 61 in the manual position the cartridge is fired at the operator's discretion. With the boost starter control switch in the "off" position, the electrical squib of the cartridge is short circuited to prevent cartridge firing under any operating conditions.

When the boost starter control switch is placed in the "automatic" position, the cartridge will be automatically fired under the following conditions: The start button is depressed and the turbine outlet temperature exceeds a preselected value T*, or the start button is depressed and the turbine speed fails to reach a predetermined speed N*, by time $t$*. The preset values, $N_1$*, $t_1$* and T* depend upon the operational specifications for a given turbine engine.

With switch, 61, in the automatic position, closing of the start switch, 62 will energize the start relay, 63 thus initiating a normal electrical start of the turbine engine, 19. Closing of relay 63, will also energize the timer 65, which delivers a voltage proportional to time to the comparator 66.

As the turbine 19, accelerates, its tachometer generator, 69 delivers a voltage proportional to turbine speed $N_1$ to the comparator 66. Also, a thermocouple in the exhaust 70, delivers a voltage proportional to temperature, T, to the comparator.

The aforementioned signal voltages $t$, $N_1$, and T are amplified in the comparator and compared electrically with preset voltage values $t$*, $N_1$*, and T*. If T should exceed T* at any time, a solid state or electromechanical relay is triggered producing the output signal of sufficient strength to fire the electrical squib initiating the cartridge, and hence the boost starter. Also, when the signal voltage, $t$ reaches a level $t$* the $N_1$ voltage at that time is compared with N*. If it is greater than N* no output occurs but if it is less than N*, a solid state or electromechanical relay is triggered to produce an output signal of sufficient strength to fire the electrical squib.

The electronic and electrical components, either of the solid state variety, such as Zener diodes and Silicon controlled junction rectifiers or as an alternative, sensitive electromechanical relays are available within the present state of the art to provide the above-mentioned switching functions.

Voltage amplification of the signal voltages can be accomplished with either transistorized components or vacuum tubes as desired and is also well within the state of the art.

With switch 61 in the "off" position it is seen that the electrical squib of the cartridge cannot be initiated. With switch 61, in the manual position the electrical squib can be fired at any time the operator so desires by depressing the Manual Boost Initiator 71.

A "ready" light, (not shown) glows whenever the control switch 61 is in either the "automatic" or the "manual" position, and the cartridge is available for firing. A relay (not shown) for energizing this light would be activated by a small current passing through the electrical squib of the cartridge. This current is too small to fire the cartridge but large enough to trigger the "ready" light relay.

It will be understood that the foregoing description has related to a particular embodiment or embodiments and is representative. Therefore, in order to appreciate fully the spirit and scope of the invention, reference should be made to the appended claims.

I claim:

1. In combination with a starter for an engine capable of delivering sufficient power ordinarily to start said engine, a starter shaft connected to said engine, means including a starter housing for mounting said starter to said engine to drive said engine, a (rotary gas-driven) boost motor, means for mounting said boost motor directly to said starter (housing) immediately adjacent to said starter, (and clutch means intermediate said starter and boost motor for selectively engaging and disengaging said boost motor from said starter shaft.) means for connecting said boost motor to said starter to drive said starter and means for only actuating said boost motor to add power to said starter when said starter has insufficient power alone to start said engine.

2. The combination of claim 1 (which further includes) wherein said boost motor is a rotary gas-driven boost motor, wherein said actuating means includes gas generator means (is provided) for firing a chemical propellant (and), means for conducting gas from said generator means to said boost motor and means for initiating firing of said chemical propellant.

3. The combination of claim 2 wherein the engine in a turbine engine, said starter is an electric starter ordinarily capable of continuous high rotational operation for a substantial period of time and said boost motor is capable of similar high rotational output at lesser power than required to start the engine.

4. The combination of claim 3 wherein the starter is a starter generator, and clutch means effects positive engagement between said boost motor and starter at speeds less than the starting speed of said engine and effects disengagement between said starter and boost motor at a selected speed above starting speed.

5. In combination, a gas turbine engine of the type having an electric starting motor or starter generator capable of delivering sufficient power ordinarily to start said engine, means for mounting said starting motor upon said engine and having a starter shaft connected to said engine to a starting speed, a boost motor and means for mounting said boost motor coaxially to said starter shaft, to drive same only when said starting motor or generator has insufficient power to start said engine.

6. The combination of claim 5 wherein said boost motor is an extension of said starter and is dependent upon said starter mounting means for its mounting support.

7. The combination of claim 6 wherein clutch means is provided between said starter shaft and boost motor for selectively engaging and disengaging the boost motor from said starter shaft.

8. The combination of an electric starter for an engine capable of delivering sufficient power ordinarily to start said engine and a boost motor for said starter comprising a housing, an electric starter secured within said housing a starter shaft connected at one end to said engine, a rotary gas boost motor secured within said housing adjacent to the other end of said starter shaft, rotor means within said boost motor coaxial with respect to said starter shaft and means for connecting said rotor to said starter shaft, to drive same only when said starting motor or generator has insufficient power to start said engine.

9. The combination according to claim 8 in which said connecting means is a clutch for selectively engaging and disengaging said boost motor from said starter shaft.

10. The combination according to claim 8 in which said rotor means is fixedly connected by a shaft to a backing plate, a clutch member mounted for rotation to said shaft coaxially with respect to said backing plate, lug means on each of said backing plate forming a driving connection therebetween, spring means intermediate said backing plate and clutch member urging said lug means rotatably out of engagement, a collar affixed to said starter shaft adjacent to said clutch means, centrifugal lugs pivotally mounted to said collar means, spring means urging said centrifugal lugs against said clutch member, and means for receiving said lugs in said clutch member to form a driving connection between said clutch member and lugs with centrifugal force due to rotation of said starter shaft drawing said lugs free of said clutch member.

* * * * *